(12) United States Patent
Tsuruyama (10) Patent No.: US 12,418,620 B2
(45) Date of Patent: Sep. 16, 2025

(54) PRINTING CONTROL DEVICE, METHOD FOR CONTROLLING PRINTING CONTROL DEVICE, AND NON-TRANSITORY COMPUTER-READABLE STORAGE MEDIUM STORING PROGRAM

(71) Applicant: SEIKO EPSON CORPORATION, Tokyo (JP)

(72) Inventor: Shinichi Tsuruyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/614,834

(22) Filed: Mar. 25, 2024

(65) Prior Publication Data

US 2024/0333846 A1    Oct. 3, 2024

(30) Foreign Application Priority Data

Mar. 27, 2023   (JP) .................. 2023-049541

(51) Int. Cl.
| G06F 15/00 | (2006.01) |
| G06Q 30/015 | (2023.01) |
| H04N 1/00 | (2006.01) |
| H04N 1/32 | (2006.01) |

(52) U.S. Cl.
CPC ....... *H04N 1/00344* (2013.01); *G06Q 30/015* (2023.01); *H04N 1/00244* (2013.01); *H04N 1/00403* (2013.01); *H04N 1/00488* (2013.01); *H04N 1/32101* (2013.01); *H04N 2201/3209* (2013.01)

(58) Field of Classification Search
None
See application file for complete search history.

(56) References Cited

U.S. PATENT DOCUMENTS

2010/0302586 A1 * 12/2010 Takahashi ................. G06T 3/00
                                                                    709/219

FOREIGN PATENT DOCUMENTS

| EP | 3901881 A1 * | 10/2021 | ......... G06F 16/9532 |
| JP | 2005-122658 A | 5/2005 | |

* cited by examiner

*Primary Examiner* — Mark R Milia
(74) *Attorney, Agent, or Firm* — WORKMAN NYDEGGER (57) ABSTRACT

A first server device is a first server device communicably connected to a first printer and a second server device disposed at a customer support center. The first server device includes: a first acquisition unit configured to acquire, from the first printer, question information indicating a content of a question input from a user by voice regarding an operation method of the first printer; and a transmission unit configured to transmit, to the second server device, inquiry information including the question information.

8 Claims, 6 Drawing Sheets

PRINTING CONTROL DEVICE, METHOD FOR CONTROLLING PRINTING CONTROL DEVICE, AND NON-TRANSITORY COMPUTER-READABLE STORAGE MEDIUM STORING PROGRAM

The present application is based on, and claims priority from JP Application Serial Number 2023-049541, filed Mar. 27, 2023, the disclosure of which is hereby incorporated by reference herein in its entirety.

BACKGROUND

1. Technical Field

The present disclosure relates to a printing control device, a method for controlling a printing control device, and a non-transitory computer-readable storage medium storing a program.

2. Related Art

JP-A-2005-122658 discloses a system for notifying an ID of a user by the user calling customer support when a defect occurs in a printer.

JP-A-2005-122658 is an example of the related art.

SUMMARY

However, in the system described in JP-A-2005-122658, when a defect occurs in a printer or when a method of operating a printer is unknown, a user takes time and effort to call customer support, which deteriorates the convenience.

A printing control device according to an aspect for solving the above problems is a printing control device communicably connected to an image forming device and a server device disposed at a customer support center. The printing control device includes: a first acquisition unit configured to acquire, from the image forming device, question information indicating a content of a question input from a user by voice regarding an operation method of the image forming device; and a transmission unit configured to transmit, to the server device, inquiry information including the question information.

A method for controlling a printing control device according to another aspect for solving the above problems is a method for controlling a printing control device communicably connected to an image forming device and a server device disposed at a customer support center. The method includes: a first acquisition step of acquiring, from the image forming device, question information indicating a content of a question input from a user by voice regarding an operation method of the image forming device; and a transmission step of transmitting, to the server device, inquiry information including the question information.

According to a non-transitory computer-readable storage medium storing a program executed by a processor of a printing control device, the printing control device being communicably connected to an image forming device and a server device disposed at a customer support center, the program causes the processor to function as: a first acquisition unit configured to acquire, image forming device, question information indicating a content of a question input from a user by voice regarding an operation method of the image forming device; and a transmission unit configured to transmit, to the server device, inquiry information including the question information.

DESCRIPTION OF EMBODIMENTS

Hereinafter, the embodiment will be described with reference to the drawings.

Figure 1:
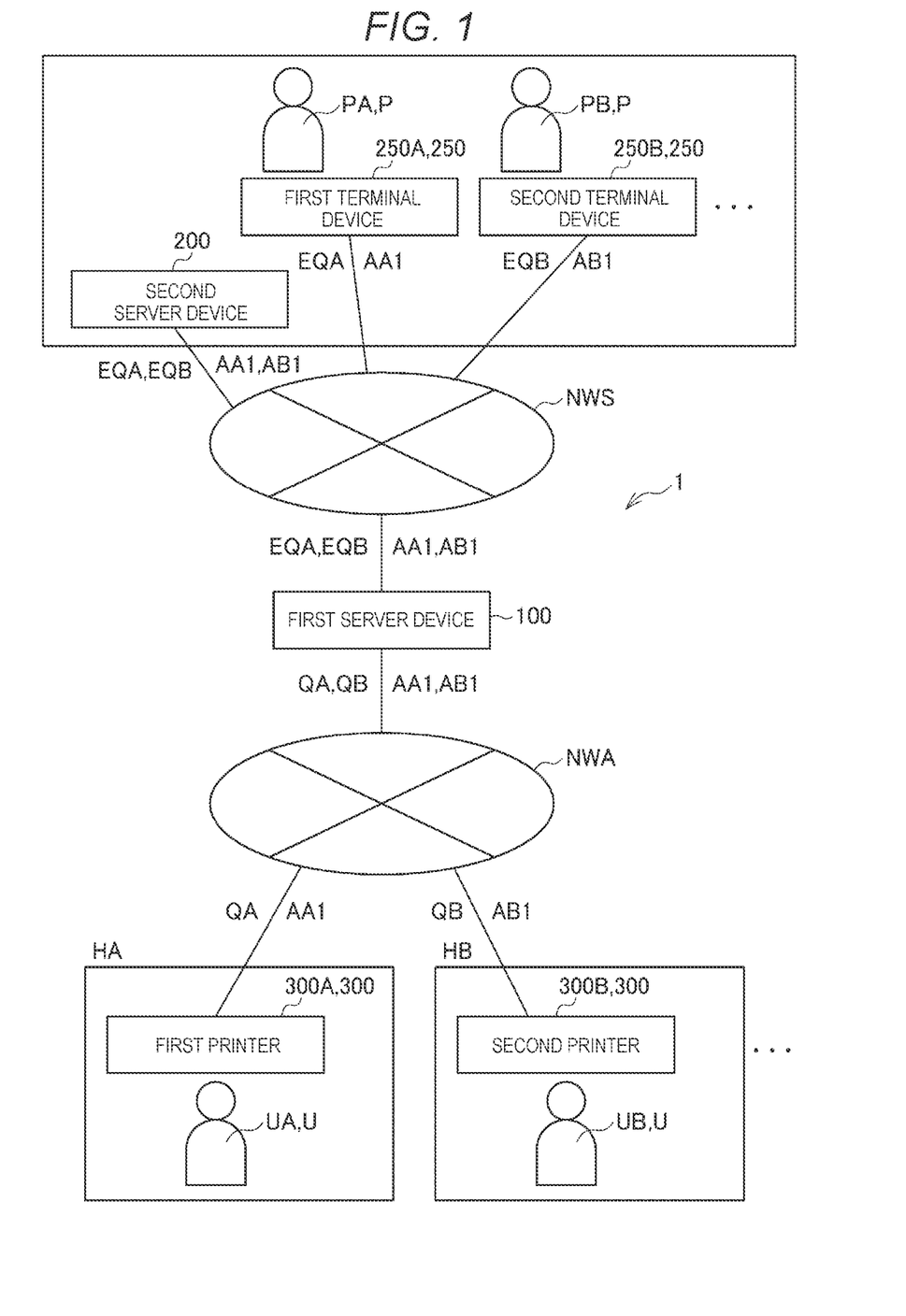
FIG. 1 is a diagram showing an example of a configuration of a printing control system according to an embodiment.

First, a configuration of a printing control system 1 according to the embodiment will be described with reference to FIG. 1. FIG. 1 is a diagram showing an example of the configuration of the printing control system 1 according to the embodiment. As shown in FIG. 1, the printing control system 1 includes a first server device 100 and a printer 300.

The first server device 100 is communicably connected to the printer 300 via a first network NWA. The first network NWA is, for example, the Internet.

In the embodiment, a case where the first network NWA is the Internet will be described, but the present disclosure is not limited thereto. The first network NWA may be, for example, a local area network (LAN) or a wide area network (WAN).

The first server device 100 is communicably connected to a second server device 200 via a second network NWS. The second network NWS is, for example, a LAN. In the embodiment, a case where the second network NWS is a LAN will be described, but the present disclosure is not limited thereto. The second network NWS may be, for example, a WAN or the Internet.

The second server device 200 is communicably connected to a terminal device 250 via the second network NWS.

The terminal device 250 is, for example, a personal computer. The terminal device 250 includes a first terminal device 250A and a second terminal device 250B. The first terminal device 250A is operated by a first operator PA. The second terminal device 250B is operated by a second operator PB. The first operator PA and the second operator PB are included in an operator P. The operator P is an operator of the terminal device 250.

The second server device 200 and the terminal device 250 are disposed at a customer support center CSC. In other words, the second server device 200 and the terminal device 250 constitute a customer support system.

The printer 300 includes a first printer 300A and a second printer 300B. As shown in FIG. 1, the first printer 300A is disposed at a room HA of a first user UA, and the second printer 300B is disposed at a room HB of a second user UB. The first user UA is a user of the first printer 300A. The second user UB is a user of the second printer 300B. The first user UA and the second user UB are included in a user U. The user U is a user of the printer 300.

The printer 300 corresponds to an example of an "image forming device".

In the embodiment, a case where the "image forming device" is the printer 300 will be described, but the present disclosure is not limited thereto. The "image forming device" may be, for example, a copying machine. In addition, the "image forming device" may be, for example, a so-called multifunction machine.

The first printer 300A accepts a question related to an operation method of the first printer 300A from the first user UA by voice. The first printer 300A transmits, to the first server device 100, question information QA indicating a content of the accepted question.

The first server device 100 acquires the question information QA from the first printer 300A. The first server device 100 transmits, to the second server device 200, inquiry information EQA including the question information QA. The second server device 200 transmits the inquiry information EQA to, for example, the first terminal device 250A.

The first operator PA operates the first terminal device 250A to generate, based on the inquiry information EQA, first answer information AA1 indicating an answer to the question information QA. In accordance with an instruction from the first operator PA, the first terminal device 250A transmits the first answer information AA1 to the second server device 200. The second server device 200 receives the first answer information AA1 and transmits the first answer information AA1 to the first server device 100.

The first server device 100 acquires the first answer information AA1 from the second server device 200 by receiving the first answer information AA1 from the second server device 200. The first server device 100 causes the first printer 300A to output the first answer information AA1. The first server device 100 causes the first printer 300A to output the first answer information AA1 by at least one of printing, voice, or image, for example. In the embodiment, the first server device 100 causes the first printer 300A to output the first answer information AA1 by voice, for example.

The second printer 300B receives a question related to an operation method of the second printer 300B from the second user UB by voice. The second printer 300B transmits, to the first server device 100, question information QB indicating a content of the accepted question.

The first server device 100 acquires the question information QB from the second printer 300B. The first server device 100 transmits, to the second server device 200, inquiry information EQB including the question information QB. The second server device 200 transmits the inquiry information EQB to, for example, the second terminal device 250B.

The second operator PB operates the second terminal device 250B to generate, based on the inquiry information EQB, first answer information AB1 indicating an answer to the question information QB. In accordance with an instruction from the second operator PB, the second terminal device 250B transmits the first answer information AB1 to the second server device 200. The second server device 200 receives the first answer information AB1 and transmits the first answer information AB1 to the first server device 100.

The first server device 100 acquires the first answer information AB1 from the second server device 200 by receiving the first answer information AB1 from the second server device 200. The first server device 100 causes the second printer 300B to output the first answer information AB1. The first server device 100 causes the second printer 300B to output the first answer information AB1 by at least one of printing, voice, or image, for example. In the embodiment, the first server device 100 causes the second printer 300B to output the first answer information AB1 by voice, for example.

The first printer 300A and the second printer 300B have substantially the same configuration. When it is not necessary to distinguish between the first printer 300A and the second printer 300B, each of the first printer 300A and the second printer 300B may be referred to as a printer 300 in the following description.

The first server device 100 corresponds to an example of a "printing control device".

In the embodiment, a case where the "printing control device" is the first server device 100 will be described, but the present disclosure is not limited thereto. The "printing control device" may be, for example, a personal computer. In addition, the printing control device may be a tablet terminal.

The second server device 200 corresponds to an example of a "server device".

In the embodiment, a case where the second server device 200 is provided separately from the first server device 100 will be described, but the present disclosure is not limited thereto. The second server device 200 may be integrated with the first server device 100.

Figure 2:
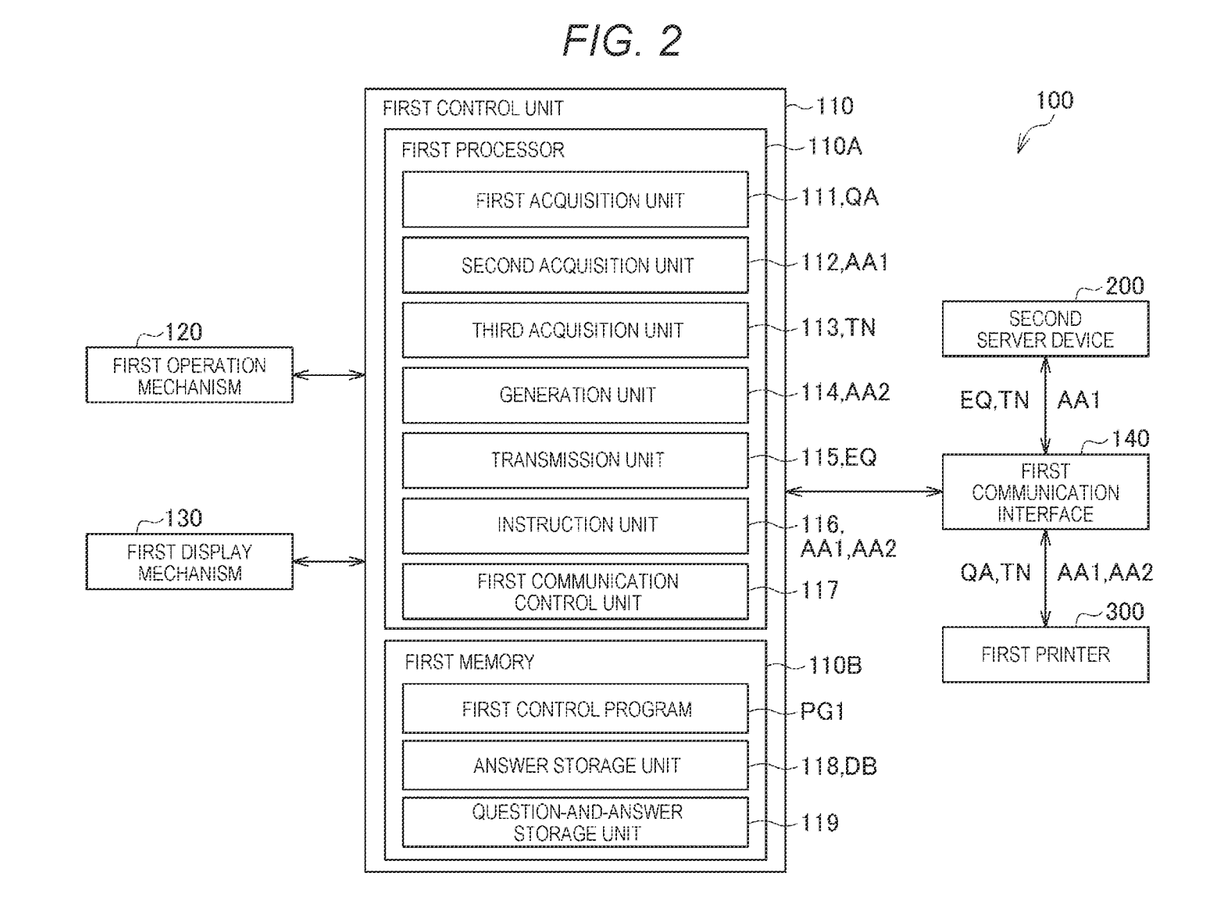
FIG. 2 is a diagram showing an example of a configuration of a first server device according to the embodiment.

Next, a configuration of the first server device 100 will be described with reference to FIG. 2. FIG. 2 is a diagram showing an example of the configuration of the first server device 100 according to the embodiment.

As shown in FIG. 2, the first server device 100 includes a first control unit 110, a first operation mechanism 120, a first display mechanism 130, and a first communication interface 140. The first control unit 110 controls units of the first server device 100. The first operation mechanism 120, the first display mechanism 130, and the first communication interface 140 are each communicably connected to the first control unit 110.

The first control unit 110 includes a first processor 110A such as a central processing unit (CPU) and a first memory 110B such as a read only memory (ROM). The first memory 110B stores a first control program PG1.

The first processor 110A may include a plurality of processors, or may include a single processor.

The first processor 110A may be hardware that is programmed to implement functions of the respective units to be described later. That is, the first processor 110A may have a configuration in which the first control program PG1 is mounted as a hardware circuit. In this case, for example, the first processor 110A is implemented by an application specific integrated circuit (ASIC), a field-programmable gate array (FPGA), or the like.

In the following description, a case where the first processor 110A executes the first control program PG1 to implement various functions of the first control unit 110 will be described.

The first memory 110B has a storage area for storing a program executed by the first processor 110A and data processed by the first processor 110A. The first memory 110B stores the first control program PG1 executed by the first processor 110A, and various pieces of image data, setting data, and the like related to an operation of the first server device 100.

The first memory 110B has a nonvolatile storage area for storing a program and data in a nonvolatile manner. The first memory 110B may have, for example, a ROM, a random access memory (RAM), a hard disk drive (HDD), and a solid state drive (SSD) as a nonvolatile storage area. The first memory 110B may also have a volatile storage area, and form a work area for temporarily storing a program executed by the first processor 110A and data to be processed. The first memory 110B may include, for example, a RAM as a volatile storage area.

The first operation mechanism 120 includes an operation switch provided in the first server device 100 and an input unit such as a touch panel. The first operation mechanism 120 detects an operation of a user and outputs a detection signal corresponding to the operation to the first control unit 110. The first control unit 110 executes processing corresponding to the operation of the user based on input from the first operation mechanism 120. The user is, for example, an administrator of the first server device 100.

The first display mechanism 130 includes a display panel such as a liquid crystal display (LCD), and displays information on the display panel under the control of the first control unit 110.

The first communication interface 140 is a communication interface that communicates with the printer 300 and the second device 200 according to the Ethernet (registered trademark) standard. The first communication interface 140 includes a connector to which an Ethernet (registered trademark) cable is coupled, and an interface circuit that processes a signal transmitted through the connector. The first communication interface 140 is an interface board having a connector and an interface circuit, and is coupled to a main board on which the first processor 110A of the first control unit 110 and the like are mounted. Alternatively, the connector and the interface circuit constituting the first communication interface 140 are mounted on the main board of the first control unit 110. The first communication interface 140 receives the question information QA, the question information QB, and the like from the printer 300. The first communication interface 140 transmits the inquiry information EQA, the inquiry information EQB, and the like to the second server device 200.

As shown in FIG. 2, the first control unit 110 includes a first acquisition unit 111, a second acquisition unit 112, a third acquisition unit 113, a generation unit 114, a transmission unit 115, an instruction unit 116, a first communication control unit 117, an answer storage unit 118, and a question-and-answer storage unit 119. These units are implemented by cooperation between software and hardware, for example, by the first processor 110A executing the first control program PG1. In other words, the first processor 110A executes the first control program PG1 to function as the first acquisition unit 111, the second acquisition unit 112, the third acquisition unit 113, the generation unit 114, the transmission unit 115, the instruction unit 116, and the first communication control unit 117. When the first processor 110A executes the first control program PG1, the first memory 110B functions as the answer storage unit 118 and the question-and-answer storage unit 119.

The first processor 110A corresponds to an example of a "processor".

The first control program PG1 corresponds to an example of a "program".

In the following description, for convenience, a case where the printer 300 is the first printer 300A will be described.

The answer storage unit 118 stores question information Q and answer information A in association with each other. The answer storage unit 118 is a so-called database that stores a large number of, for example, 10000 pieces of question information Q and a large number of, for example, 10000 pieces of answer information A in association with each other.

When the answer information A differs depending on a model of the printer 300, the answer storage unit 118 stores the answer information A in association with model information MP. The answer storage unit 118 stores the answer information A corresponding to model information MP1 in association with the model information MP1, for example. The answer storage unit 118 stores the answer information A corresponding to model information MP2 in association with the model information MP2, for example.

The question-and-answer storage unit 119 stores the question information QA, the first answer information AA1, and the second answer information AA2 in association with one another. The question-and-answer storage unit 119 stores the question information QA, the first answer information AA1, and the second answer information AA2 in association with a user ID of the first user UA, for example.

The question information QA is acquired from the first printer 300A by the first acquisition unit 111 and stored in the question-and-answer storage unit 119 by the first acquisition unit 111. The first answer information AA1 is acquired from the second server device 200 by the second acquisition unit 112 and stored in the question-and-answer storage unit 119 by the second acquisition unit 112. The second answer information AA2 is generated by the generation unit 114 and stored in the question-and-answer storage unit 119 by the generation unit 114.

For example, the first acquisition unit 111 acquires the question information QA indicating a content of a question input from the first user UA regarding the operation method of the first printer 300A. The first user UA inputs the question to the first printer 300A by voice, for example. The first printer 300A converts the voice from the first user UA to a voice signal by a microphone 320, and converts the voice signal to text information by voice recognition to generate the question information QA. The first printer 300A transmits the question information QA to the first server device 100. The first acquisition unit 111 acquires the question information QA by receiving the question information QA. The first acquisition unit 111 stores the question information QA in the question-and-answer storage unit 119 in association with the user ID of the first user UA.

The transmission unit 115 transmits, to the second server device 200, the inquiry information EQA including the question information QA.

The second d server device 200 receives the inquiry information EQA from the transmission unit 115, and transmits the inquiry information EQA to, for example, the first terminal device 250A. The first operator PA operates the first terminal device 250A to generate, based on the inquiry information EQA, first answer information AA1 indicating an answer to the question information QA. In accordance with an instruction from the first operator PA, the first terminal device 250A transmits the first answer information AA1 to the second server device 200. The second server device 200 receives the first answer information AA1 and transmits the first answer information AA1 to the first server device 100.

The second acquisition unit 112 acquires the first answer information AA1 from the second server device 200. The first answer information AA1 corresponds to the question information QA and indicates an answer input by the first operator PA of the customer support center CSC. The second acquisition unit 112 acquires the first answer information AA1 from the second server device 200 by receiving the first answer information AA1 from the second server device 200.

The third acquisition unit 113 acquires a telephone number TN of the first user UA from the first printer 300A. The third acquisition unit 113 acquires the telephone number TN of the first user UA from the first printer 300A by voice of the first user UA, for example.

The first user UA inputs the telephone number TN to the first printer 300A by voice, for example. The first printer 300A converts the voice from the first user UA into a voice signal by the microphone 320, and converts the voice signal into text information by voice recognition to generate the telephone number TN. Then, the first printer 300A transmits the telephone number TN to the first server device 100. The third acquisition unit 113 acquires the telephone number TN by receiving the telephone number TN.

The generation unit 114 generates, based on the question information QA acquired by the first acquisition unit 111 from the first printer 300A, the second answer information AA2 indicating an answer to the question. The generation unit 114 extracts a keyword from the question information QA, for example. The generation unit 114 generates the second answer information AA2 by reading the second answer information AA2 corresponding to the extracted keyword from the answer information A stored in the answer storage unit 118. The generation unit 114 stores the second answer information AA2 in the question-and-answer storage unit 119 in association with the question information QA.

The transmission unit 115 transmits, to the second server device 200, the telephone number TN of the first user UA that is acquired by the third acquisition unit 113.

The second server device 200 transmits the telephone number TN of the first user UA to the first terminal device 250A. As a result, the first operator PA can know the telephone number TN of the first user UA.

The instruction unit 116 causes the first printer 300A to output the first answer information AA1 acquired by the second acquisition unit 112. The instruction unit 116 causes the first printer 300A to output the first answer information AA1 by at least one of voice, image, or printing, for example. In the embodiment, the instruction unit 116 causes the first printer 300A to output the first answer information AA1 by voice, for example.

The instruction unit 116 causes the first printer 300A to output the second answer information AA2 generated by the generation unit 114. The instruction unit 116 causes the first printer 300A to output the second answer information AA2 by at least one of voice, image, or printing, for example. In the embodiment, the instruction unit 116 causes the first printer 300A to output the second answer information AA2 by voice, for example.

The transmission unit 115 determines whether the number of times of outputting the second answer information AA2 reaches a predetermined number of times N. When the number of times of outputting the second answer information AA2 reaches the predetermined number of times N, the transmission unit 115 transmits the inquiry information EQA to the second server device 200. The inquiry information EQA includes the question information QA and the second answer information AA2. The predetermined number of times N is, for example, two.

The second server device 200 receives the inquiry information EQA from the transmission unit 115, and transmits the inquiry information EQA to, for example, the first terminal device 250A. The first operator PA operates the first terminal device 250A to generate, based on the inquiry information EQA, first answer information AA1 indicating an answer to the question information QA. In accordance with an instruction from the first operator PA, the first terminal device 250A transmits the first answer information AA1 to the second server device 200. The second server device 200 receives the first answer information AA1 and transmits the first answer information AA1 to the first server device 100.

The second acquisition unit 112 acquires the first answer information AA1 from the second server device 200. The instruction unit 116 causes the first printer 300A to output the first answer information AA1 acquired by the second acquisition unit 112.

The instruction unit 116 also causes the first printer 300A to output a fact that the telephone number TN of the first user UA is transmitted to the second server device 200. The instruction unit 116 causes the first printer 300A to output, by at least one of voice, image, or printing, for example, the fact that the telephone number TN of the first user UA is transmitted to the second server device 200. In the embodiment, the instruction unit 116 causes the first printer 300A to output, by voice, for example, the fact that the telephone number TN of the first user UA is transmitted to the second server device 200.

The first communication control unit 117 receives the question information QA and the telephone number TN of the first user UA from the first printer 300A.

The first communication control unit 117 transmits inquiry information EQ to the second server device 200. The first communication control unit 117 receives the first answer information AA1 from the second server device 200.

The first communication control unit 117 also transmits the first answer information AA1 and the second answer information AA2 to the first printer 300A.

Figure 3:
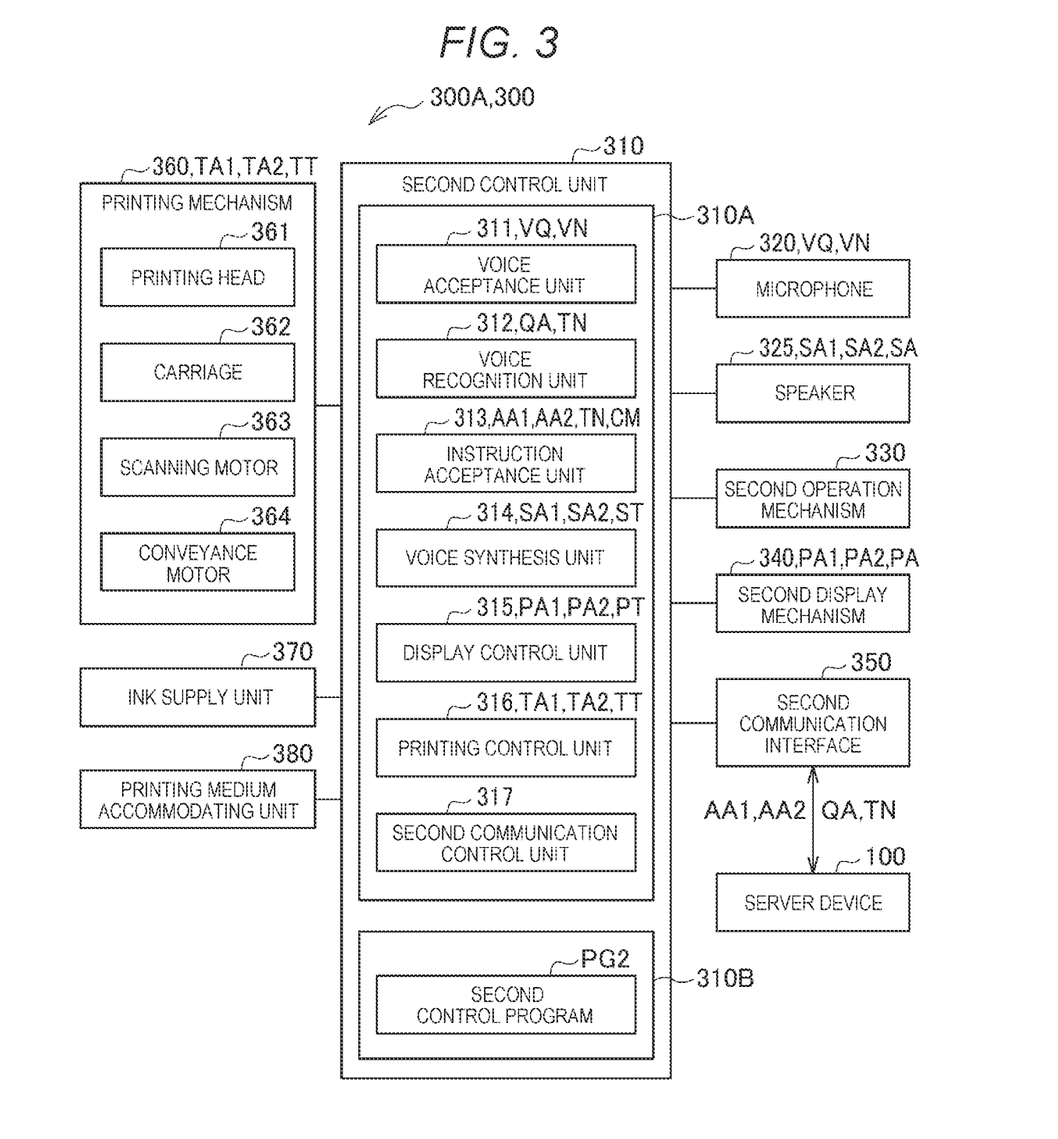
FIG. 3 is a diagram showing an example of a configuration of a printer according to the embodiment.

Next, a configuration of the first printer 300A will be described with reference to FIG. 3. FIG. 3 is a diagram showing an example of the configuration of the printer 300 according to the embodiment. The first printer 300A and the second printer 300B have substantially the same configuration. The configuration of the first printer 300A will be described with reference to FIG. 3.

As shown in FIG. 3, the first printer 300A includes a second control unit 310, the microphone 320, a speaker 325, a second operation mechanism 330, a second display mechanism 340, a second communication interface 350, a printing mechanism 360, an ink supply unit 370, and a printing medium accommodating unit 380.

The second control unit 310 controls an operation of each unit of the first printer 300A. The microphone 320, the speaker 325, the second operation mechanism 330, the second display mechanism 340, the second communication interface 350, and the printing mechanism 360 each communicate with the second control unit 310.

The second control unit 310 includes a second processor 310A such as a CPU, and a second memory 310B such as a ROM and a RAM, and controls units of the first printer 300A. The second memory 310B stores a second control program PG2. The second memory 310B may include a magnetic storage device such as an HDD and a semiconductor storage device such as an SSD.

In the second control unit 310, the second processor 310A executes processing of reading the second control program PG2 stored in the second memory 310B. In other words, the second control unit 310 executes processing by cooperation of hardware and software.

The second processor 310A may include a single processor, or a plurality of processors may be provided to function as the second processor 310A.

In the embodiment, the second processor 310A executes the second control program PG2 to control the units of the printer 300, but the present disclosure is not limited thereto. The second control unit 310 may include, for example, an ASIC, and the ASIC may execute processing by using an implemented function. The second control unit 310 may include, for example, a signal processing circuit, and the signal processing circuit may execute signal processing to execute the processing.

The microphone 320 accepts voice from the first user UA, generates a voice signal, and transmits the generated voice signal to the second control unit 310.

The speaker 325 outputs the voice under the control of the second control unit 310. The speaker 325 outputs, for example, voice generated by a voice synthesis unit 314.

The second operation mechanism 330 includes an operation switch provided in the first printer 300A and an input unit such as a touch panel. The second operation mechanism 330 detects an operation of the first user UA on the input unit, and outputs a detection signal corresponding to the operation to the second control unit 310. The second control unit 310 executes processing corresponding to the operation of the first user UA based on input from the second operation mechanism 330.

The second display mechanism 340 includes a plurality of light emitting diodes (LEDs) and a display panel such as an LCD. The second display mechanism 340 executes lighting, extinction, and blinking of the LEDs in a predetermined mode, display of information on the display panel, and the like under the control of the second control unit 310.

The second communication interface 350 is a communication interface that communicates with the first server device 100 according to the Ethernet (registered trademark) standard. The second communication interface 350 includes a connector to which an Ethernet (registered trademark) cable is coupled, and an interface circuit that processes a signal transmitted through the connector. The second communication interface 350 is an interface board having a connector and an interface circuit, and is coupled to a main board on which the second processor 310A of the second control unit 310 and the like are mounted. Alternatively, the connector and the interface circuit constituting the second communication interface 350 are mounted on the main board of the second control unit 310. The second communication interface 350 receives the first answer information AA1, the second answer information AA2, and the like from the first server device 100.

The printing mechanism 360 prints characters, images, and the like on a printing medium M such as printing paper using ink under the control of the second control unit 310. The printing mechanism 360 includes, as a configuration related to printing, a printing head 361, a carriage 362, a scanning motor 363, and a conveyance motor 364.

The printing head 361 is an ink jet type, and ejects ink supplied from the ink supply unit 370 toward the printing medium M. The carriage 362 carries the printing head 361 and scans in a main scanning direction X. The main scanning direction X intersects a sub scanning direction Y. The sub scanning direction Y indicates a conveyance direction of the printing medium M. The scanning motor 363 causes the carriage 362 to scan in the main scanning direction X. The conveyance motor 364 conveys the printing medium M in the conveyance direction.

The printing mechanism 360 executes a printing function. The printing mechanism 360 will be further described with reference to FIG. 4.

The ink supply unit 370 accommodates an ink tank that stores ink, and supplies ink from the ink tank to the printing head 361 of the printing mechanism 360. The ink supplied by the ink supply unit 370 is, for example, cyan (C) ink, magenta (M) ink, yellow (Y) ink, and black (K) ink.

The printing medium accommodating unit 380 can accommodate the printing medium M. When the printing medium M is cut paper, the printing medium accommodating unit 380 feeds the accommodated cut paper to a conveyance path (not shown) by conveyance of the conveyance motor 364. The printing medium accommodating unit 380 may collect printed matter which is the printing medium M after printing. The printed matter may be collected by placing the cut paper in a stacked manner.

Next, functional blocks of the second control unit 310 of the first printer 300A will be described.

The second control unit 310 includes, as the functional blocks, a voice acceptance unit 311, a voice recognition unit 312, an instruction acceptance unit 313, a voice synthesis unit 314, a display control unit 315, a printing control unit 316, and a second communication control unit 317. When the second processor 310A executes the second control program PG2, the second processor 310A functions as the voice acceptance unit 311, the voice recognition unit 312, the instruction acceptance unit 313, the voice synthesis unit 314, the display control unit 315, the printing control unit 316, and the second communication control unit 317.

The voice acceptance unit 311 accepts, via the microphone 320, a voice signal VQ indicating a question related to the operation method of the first printer 300A from the first user UA. The voice signal VQ corresponds to the question information QA.

The voice acceptance unit 311 accepts, via the microphone 320, a voice signal VN indicating the telephone number TN from the first user UA.

The voice recognition unit 312 performs voice recognition on the voice signal VQ accepted by the voice acceptance unit 311, and generates the question information QA as text information corresponding to the voice signal VQ. The voice recognition unit 312 transmits the generated question information QA to the first server device 100.

The voice recognition unit 312 performs voice recognition on the voice signal VN accepted by the voice acceptance unit 311, and generates the telephone number TN as text information corresponding to the voice signal VN. The voice recognition unit 312 transmits the generated telephone number TN to the first server device 100.

The instruction acceptance unit 313 accepts, from the first server device 100, instruction information CM indicating to output, by at least one of printing, voice, or image, the first answer information AA1 and the second answer information AA2.

The instruction acceptance unit 313 accepts, from the first server device 100, the instruction information CM indicating to output, by at least one of printing, voice, or image, the fact that the telephone number TN of the first user UA is transmitted to the server device.

When the instruction information CM indicates to output by voice, the voice synthesis unit 314 generates, by voice first synthesis, voice information SA1 corresponding to the first answer information AA1, and causes the speaker 325 to output the first voice information SA1. When the instruction information CM indicates to output by voice, the voice synthesis unit 314 generates, by voice synthesis, second voice information SA2 corresponding to the second answer information AA2, and causes the speaker 325 to output the second voice information SA2.

When the instruction information CM indicates to output by voice, the voice synthesis unit 314 generates, by voice synthesis, voice information ST indicating that the telephone number TN is transmitted to the first server device 100, and causes the speaker 325 to output the voice information ST.

When the instruction information CM indicates to output by image, the display control unit 315 generates first image information PA1 corresponding to the first answer information AA1, and causes the display panel of the second display mechanism 340 to display the first image information PA1. When the instruction information CM indicates to output by image, the display control unit 315 generates second image information PA2 corresponding to the second answer information AA2, and causes the display panel of the second display mechanism 340 to display the second image information PA2.

When the instruction information CM indicates to output by image, the display control unit 315 generates image information PT indicating that the telephone number TN is transmitted to the first server device 100, and causes the display panel of the second display mechanism 340 to display the image information PT.

When the instruction information CM indicates to output by printing, the printing control unit 316 generates first printing information TA1 corresponding to the first answer information AA1, and causes the printing mechanism 360 to print the first printing information TA1. When the instruction information CM indicates to output by printing, the printing control unit 316 generates second printing information TA2 corresponding to the second answer information AA2, and causes the printing mechanism 360 to print the second printing information TA2.

When the instruction information CM indicates to output by printing, the printing control unit 316 generates printing information TT indicating that the telephone number TN is transmitted to the first server device 100, and causes the printing mechanism 360 to print the printing information TT.

The second communication control unit 317 transmits the question information QA and the telephone number TN of the first user UA to the first server device 100.

The second communication control unit 317 receives the instruction information CM from the first server device 100. The instruction information CM indicates to output, by voice, the first answer information AA1 and the second answer information AA2. The instruction information CM indicates to output, by at least one of printing, voice, or image, the fact that the telephone number TN is transmitted to the first server device 100.

In the embodiment, a case where the printer 300 includes the microphone 320 and the speaker 325, and the second control unit 310 of the printer 300 includes the voice recognition unit 312 and the voice synthesis unit 314 is described, but the present disclosure is not limited thereto. The printer 300 may be communicably connected to, for example, a smartphone, the smartphone may include the microphone 320 and the speaker 325, and a control unit of the smartphone may include the voice recognition unit 312 and the voice synthesis unit 314. The printer 300 may be communicably connected to, for example, a so-called AI speaker, the AI speaker may include the microphone 320 and the speaker 325, and a control unit of the AI speaker may include the voice recognition unit 312 and the voice synthesis unit 314.

Figure 4:
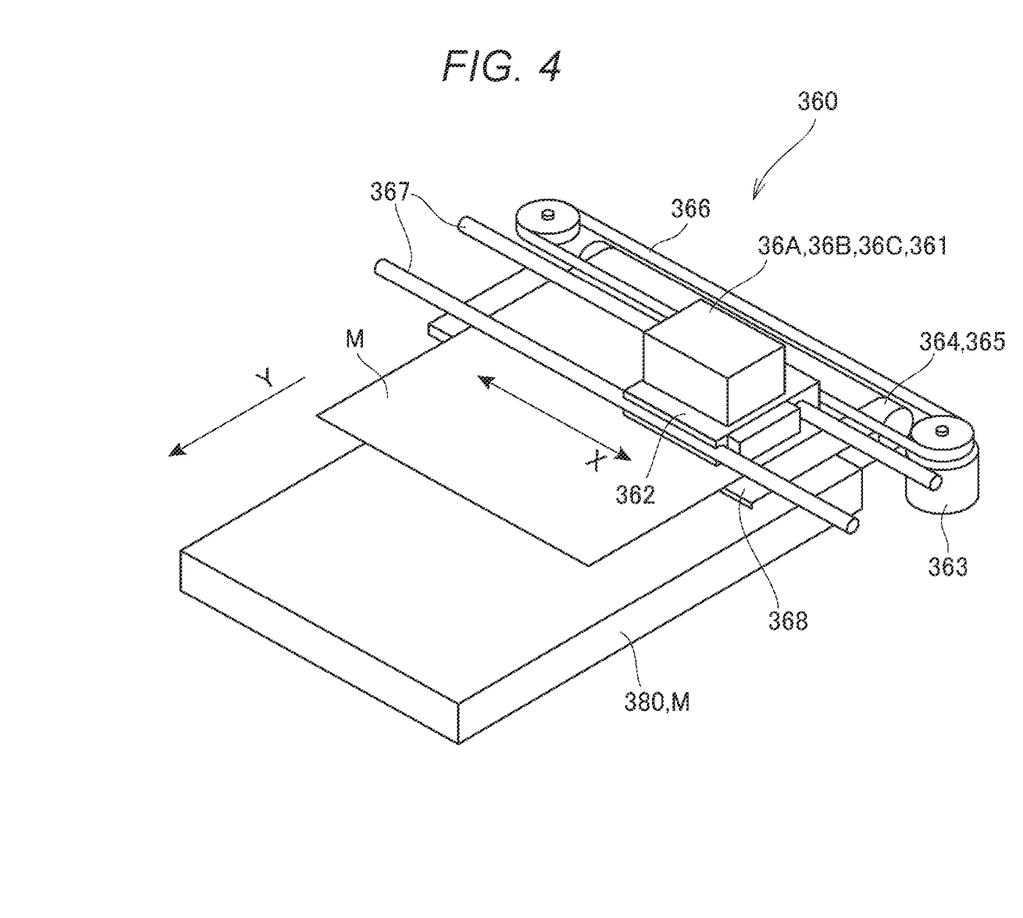
FIG. 4 is a perspective view showing an example of a configuration of a printing mechanism.

Next, a configuration of the printing mechanism 360 will be described with reference to FIG. 4. FIG. 4 is a perspective view showing an example of the configuration of the printing mechanism 360.

As shown in FIG. 4, the printing mechanism 360 includes the carriage 362, the scanning motor 363, a paper feed roller 365, a traction belt 366, a guide rail 367, a platen 368, and the printing medium accommodating unit 380.

The paper feed roller 365 is driven by the conveyance motor 364. The traction belt 366 is driven by the scanning motor 363. The guide rail 367 movably supports the carriage 362 in the main scanning direction X. The carriage 362 is supported by the guide rail 367 and driven by the scanning motor 363 via the traction belt 366 in the main scanning direction X.

A head unit 36A is mounted on the carriage 362.

The head unit 36A includes a plurality of (for example, four) ink cartridges 36B and the printing head 361. The ink cartridge 36B is provided in the ink supply unit 370.

The plurality of ink cartridges 36B are attachable to and detachable from the carriage 362. The plurality of ink cartridges 36B each include ink of a different color. For example, cyan (C) ink, magenta (M) ink, yellow (Y) ink, and black (K) ink are accommodated in the ink cartridges 36B. The ink accommodated in the ink cartridge 36B is supplied to the printing head 361.

The printing head 361 has a nozzle 36C and the like. A plurality of nozzles 36C are arranged on a surface of the printing head 361 facing the platen 368 along the sub scanning direction Y. The printing head 361 ejects ink from the nozzle 36C toward the printing medium M.

The printing medium M is wound around the paper feed roller 365 from the printing medium accommodating unit 380, and is conveyed along the surface of the platen 368 in the sub scanning direction Y. The carriage 362 is pulled by the traction belt 366 driven by the scanning motor 363 and moves along the guide rail 367 in the main scanning direction X. The printing head 361 mounted on the carriage 362 also moves in the main scanning direction X.

The main scanning direction X is a direction orthogonal to the sub scanning direction Y.

With such a configuration, the printing mechanism 360 alternately repeats a liquid ejection operation in which the printing head 361 ejects ink from the nozzle 36C while moving in the main scanning direction X and a conveyance operation in which the printing medium M is conveyed in the sub scanning direction Y. As a result, the printing mechanism 360 prints an image such as characters and figures on the printing medium M.

Figure 5:
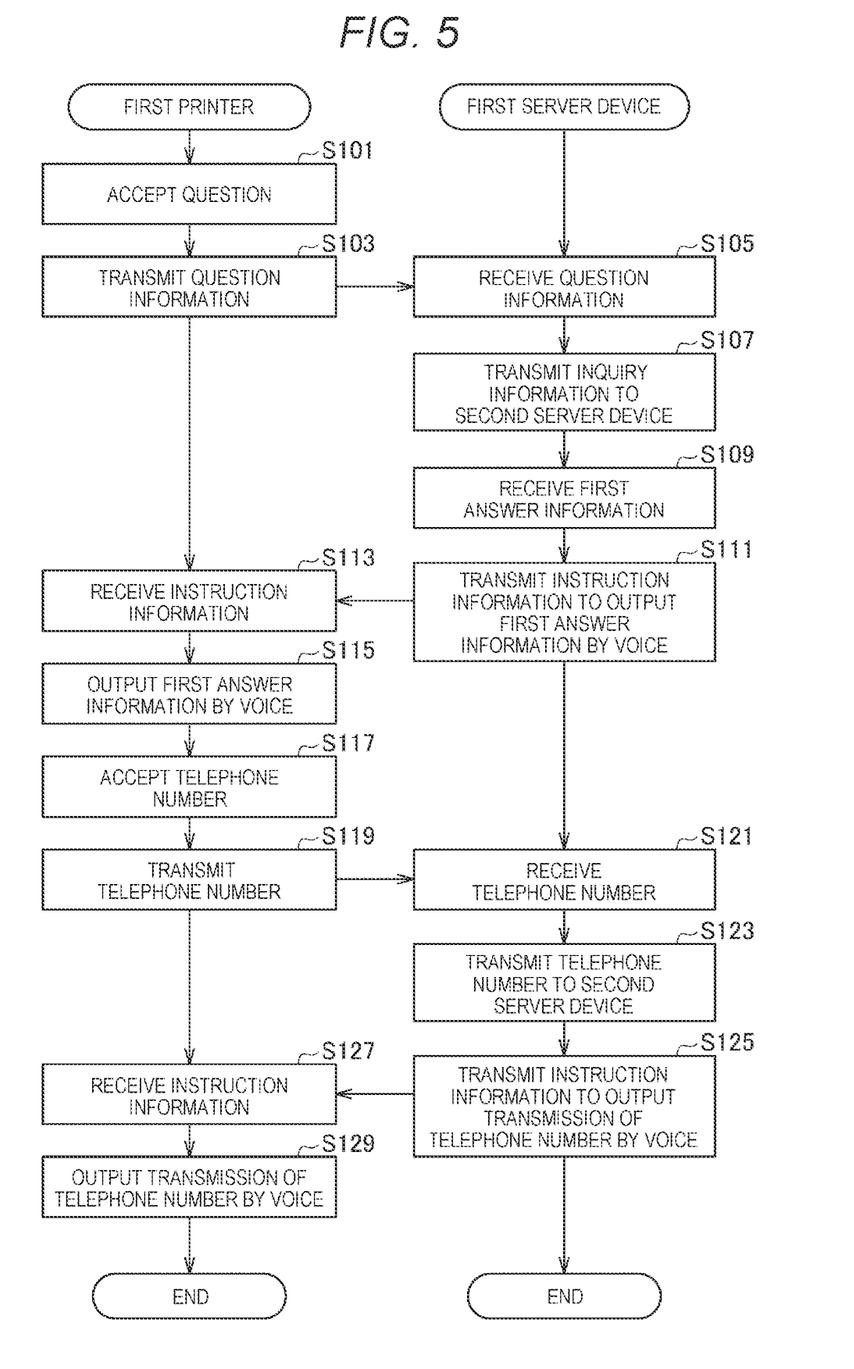
FIG. 5 is a flowchart showing an example of an operation of the printing control system.

Next, an example of an operation of the printing control system 1 will be described with reference to FIG. 5. FIG. 5 is a flowchart showing the example of the operation of the printing control system 1.

First, in step S101, the voice acceptance unit 311 of the first printer 300A accepts the voice signal VQ indicating a question from the first user UA via the microphone 320.

Next, in step S103, the voice recognition unit 312 of the first printer 300A performs voice recognition on the voice signal VQ accepted by the voice acceptance unit 311, and generates the question information QA as the text information corresponding to the voice signal VQ. Then, the voice recognition unit 312 transmits the question information QA to the first server device 100.

Next, in step S105, the first acquisition unit 111 of the first server device 100 receives the question information QA.

Next, in step S107, the transmission unit 115 of the first server device 100 transmits, to the second server device 200, the inquiry information EQA including the question information QA. The inquiry information EQA includes, for example, the question information QA, the user ID of the first user UA, and the model information MP of the first printer 300A.

The second server device 200 receives the inquiry information EQA from the transmission unit 115, and transmits the inquiry information EQA to, for example, the first terminal device 250A. The first operator PA operates the first terminal device 250A to generate, based on the inquiry information EQA, first answer information AA1 indicating an answer to the question information QA. In accordance with an instruction from the first operator PA, the first terminal device 250A transmits the first answer information AA1 to the second server device 200. The second server device 200 receives the first answer information AA1 and transmits the first answer information AA1 to the first server device 100.

Next, in step S109, the second acquisition unit 112 of the first server device 100 acquires the first answer information AA1 by receiving the first answer information AA1 from the second server device 200.

Next, in step S111, the instruction unit 116 of the first server device 100 transmits, to the first printer 300A, the instruction information CM instructing to output the first answer information AA1 by voice.

Next, in step S113, the instruction acceptance unit 313 of the first printer 300A accepts the instruction information CM by receiving the instruction information CM.

Next, in step S115, the voice synthesis unit 314 of the first printer 300A outputs the first answer information AA1 by voice. The voice synthesis unit 314 of the first printer 300A generates the first voice information SA1 corresponding to the first answer information AA1 by voice synthesis, and causes the speaker 325 to output the first voice information SA1.

Next, in step S117, the voice acceptance unit 311 of the first printer 300A accepts the voice signal VN indicating the telephone number TN from the first user UA via the microphone 320.

Next, in step S119, the voice recognition unit 312 of the first printer 300A performs voice recognition on the voice signal VN accepted by the voice acceptance unit 311, and generates the telephone number TN as the text information corresponding to the voice signal VN. The voice recognition unit 312 of the first printer 300A transmits the generated telephone number TN to the first server device 100.

Next, in step S121, the third acquisition unit 113 of the first server device 100 acquires the telephone number TN by receiving the telephone number TN from the first printer 300A.

Next, in step S123, the transmission unit 115 of the first server device 100 transmits, to the second server device 200, the telephone number TN of the first user UA that is acquired by the third acquisition unit 113. The second server device 200 transmits the telephone number TN of the first user UA to the first terminal device 250A.

Next, in step S125, the instruction unit 116 of the first server device 100 transmits, to the first printer 300A, the instruction information CM instructing to output, by voice, the fact that the telephone number TN of the first user UA is transmitted to the second server device 200.

Next, in step S127, the instruction acceptance unit 313 of the first printer 300A accepts the instruction information CM by receiving the instruction information CM.

Next, in step S129, the voice synthesis unit 314 of the first printer 300A outputs the first answer information AA1 by voice. The voice synthesis unit 314 of the first printer 300A generates, by voice synthesis, the voice information ST indicating that the telephone number TN of the first user UA is transmitted to the second server device 200, and causes the speaker 325 to output the voice information ST. Thereafter, the processing ends.

Step S105 corresponds to an example of a "first acquisition step". Step S107 corresponds to an example of a "transmission step".

As described above with reference to FIG. 5, the telephone number TN of the first user UA is transmitted to the first terminal device 250A operated by the first operator PA after the first printer 300A outputs the first answer information AA1 from the first operator PA for the question from the first user UA. Therefore, the first operator PA can call the first user UA as necessary and respond to the question of the first user UA. On the other hand, the first user UA does not need to call the customer support center CSC to ask the operator P a question. That is, convenience of the first user UA can be improved.

Figure 6:
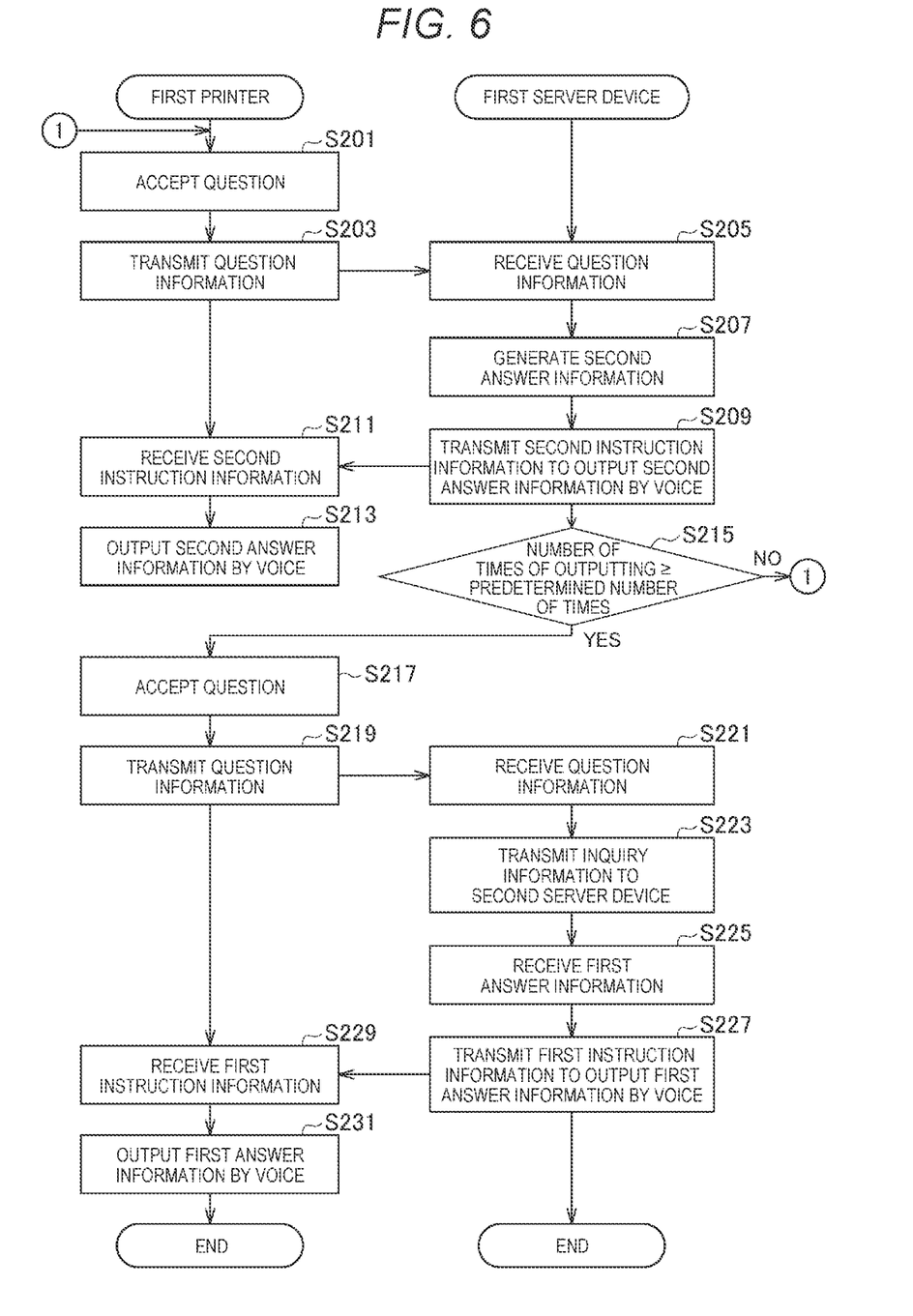
FIG. 6 is a flowchart showing another example of the operation of the printing control system.

Next, another example of the operation of the printing control system 1 will be described with reference to FIG. 6. FIG. 6 is a flowchart showing the other example of the operation of the printing control system 1.

First, in step S201, the voice acceptance unit 311 of the first printer 300A accepts the voice signal VQ indicating a question from the first user UA via the microphone 320.

Next, in step S203, the voice recognition unit 312 of the first printer 300A performs voice recognition on the voice signal VQ accepted by the voice acceptance unit 311, and generates the question information QA as the text information corresponding to the voice signal VQ. Then, the voice recognition unit 312 transmits the question information QA to the first server device 100.

Next, in step S205, the first acquisition unit 111 of the first server device 100 acquires the question information QA by receiving the question information QA from the first printer 300A.

Next, in step S207, the generation unit 114 of the first server device 100 generates, based on the question information QA, the second answer information AA2 indicating an answer to the question.

Next, in step S209, the instruction unit 116 of the first server device 100 transmits, to the first printer 300A, the instruction information CM instructing to output the second answer information AA2 by voice.

Next, in step S211, the instruction acceptance unit 313 of the first printer 300A accepts the instruction information CM by receiving the instruction information CM.

Next, in step S213, the voice synthesis unit 314 of the first printer 300A outputs the second answer information AA2 by voice. That is, the voice synthesis unit 314 of the first printer 300A generates, by voice synthesis, the second voice information SA2 indicating the second answer information AA2, and causes the speaker 325 to output the second voice information SA2.

Next, in step S215, the transmission unit 115 of the first server device 100 determines whether the number of times of outputting the second answer information AA2 reaches the predetermined number of times N.

When the transmission unit 115 determines that the number of times of outputting the second answer information AA2 does not reach the predetermined number of times N (step S215; NO), the processing returns to step S201. Then, the processing from step S201 to step S215 is repeatedly executed. When the transmission unit 115 determines that the number of times of outputting the second answer information AA2 reaches the predetermined number of times N (step S215; YES), the processing proceeds to step S217.

In step S217, the voice acceptance unit 311 of the first printer 300A accepts the voice signal VQ indicating a question from the first user UA via the microphone 320.

Next, in step S219, the voice recognition unit 312 of the first printer 300A performs voice recognition on the voice signal VQ accepted by the voice acceptance unit 311, and generates the question information QA as the text information corresponding to the voice signal VQ. Then, the voice recognition unit 312 transmits the question information QA to the first server device 100.

Next, in step S221, the first acquisition unit 111 of the first server device 100 acquires the question information QA by receiving the question information QA from the first printer 300A.

Next, in step S223, the transmission unit 115 of the first server device 100 transmits, to the second server device 200, the inquiry information EQA including the question information QA. The inquiry information EQA includes, for example, the question information QA, the second answer information AA2, the user ID of the first user UA, and the model information MP of the first printer 300A.

The second server device 200 receives the inquiry information EQA from the transmission unit 115, and transmits the inquiry information EQA to, for example, the first terminal device 250A. The first operator PA operates the first terminal device 250A to generate, based on the inquiry information EQA, first answer information AA1 indicating an answer to the question information QA. In accordance with an instruction from the first operator PA, the first terminal device 250A transmits the first answer information AA1 to the second server device 200. The second server device 200 receives the first answer information AA1 and transmits the first answer information AA1 to the first server device 100.

Next, in step S225, the second acquisition unit 112 of the first server device 100 acquires the first answer information AA1 by receiving the first answer information AA1 from the second server device 200.

Next, in step S227, the instruction unit 116 of the first server device 100 transmits, to the first printer 300A, the instruction information CM instructing to output the first answer information AA1 by voice.

Next, in step S229, the instruction acceptance unit 313 of the first printer 300A accepts the instruction information CM by receiving the instruction information CM.

Next, in step S231, the voice synthesis unit 314 of the first printer 300A outputs the first answer information AA1 by voice. That is, the voice synthesis unit 314 of the first printer 300A generates the first voice information SA1 corresponding to the first answer information AA1 by voice synthesis, and causes the speaker 325 to output the first voice information SA1. Thereafter, the processing ends.

Step S221 corresponds to an example of the "first acquisition step". Step S223 corresponds to an example of the "transmission step".

As described with reference to FIG. 6, when the number of times of outputting the second answer information AA2 generated by the generation unit 114 reaches the predetermined number of times N, the transmission unit 115 transmits, to the second server device 200, the inquiry information EQA including the question information QA. The second server device 200 acquires the first answer information AA1 generated by the first operator PA from the first terminal device 250A, and transmits the first answer information AA1 to the first server device 100. In accordance with the instruction from the first server device 100, the speaker 325 outputs the first voice information SA1 corresponding to the first answer information AA1 generated by the first operator PA.

That is, when the number of times of outputting the second answer information AA2 generated by the generation unit 114 reaches the predetermined number of times N, the first user UA can know the first answer information AA1 generated by the first operator PA in response to the question information QA of the first user UA. Therefore, the first user UA can know the first answer information AA1 generated by the first operator PA of the customer support center CSC without calling the customer support center CSC. Accordingly, the convenience of the first user UA can be improved.

By setting the predetermined number of times N to an appropriate number of times, a timing of changing to acquire the first answer information AA1 generated by the first operator PA instead of the second answer information AA2 generated by the generation unit 114 can be appropriately set. Accordingly, the convenience of the first user UA can be improved.

In the embodiment, the case where the instruction unit 116 of the first server device 100 causes the first printer 300A to output the first answer information AA1 and the second answer information AA2 by voice is described, but the present disclosure is not limited thereto. The instruction unit 116 may cause the first printer 300A to output the first answer information AA1 and the second answer information AA2 by at least one of printing, voice, or image. For example, the instruction unit 116 may cause the first printer 300A to output the first answer information AA1 and the second answer information AA2 by voice and image. For example, the instruction unit 116 may cause the first printer 300A to output the first answer information AA1 and the second answer information AA2 by printing.

As described above with reference to FIGS. 1 to 6, the first server device 100 according to the embodiment is the first server device communicably connected to the first printer 300A and the second server device 200 disposed at the customer support center CSC. The first server device 100 includes: the first acquisition unit 111 configured to acquire, from the first printer 300A, the question information QA indicating the content of the question input from the first user UA by voice regarding the operation method of the first printer 300A; and the transmission unit 115 configured to transmit, to the second server device 200, the inquiry information EQ including the question information QA.

According to this configuration, the inquiry information EQ including the question information QA indicating the content of the question input from the first user UA by voice regarding the operation method of the first printer 300A is transmitted to the second server device 200 disposed at the customer support center CSC. Therefore, the operator P of the customer support center CSC can transmit an answer to the question information QA to the first user UA. Accordingly, the convenience of the first user UA can be improved.

The first server device 100 according to the embodiment further includes: the second acquisition unit 112 configured to acquire, from the second server device 200, the first answer information AA1 corresponding to the question information QA and indicating an answer input by the first operator PA of the customer support center CSC; and the instruction unit 116 configured to cause the first printer 300A to output the first answer information AA1.

According to this configuration, the first answer information AA1 corresponding to the question information QA and indicating the answer input by the first operator PA of the customer support center CSC is acquired from the second server device 200 and output to the first printer 300A. Therefore, the first user UA can know the first answer information AA1 corresponding to the question information QA and indicating the answer input by the first operator PA of the customer support center CSC. Accordingly, the convenience of the first user UA can be improved.

The first server device 100 according to the embodiment further includes: the third acquisition unit 113 configured to acquire the telephone number TN of the first user UA from the first printer 300A. The transmission unit 115 transmits the telephone number TN to the second server device 200. The instruction unit 116 causes the first printer 300A to output a fact that the telephone number TN is transmitted to the second server device 200.

According to this configuration, since the telephone number TN of the first user UA is transmitted to the second server device 200, the operator P of the customer support center CSC can answer the first user UA by calling as necessary. Therefore, the first user UA does not need to call the customer support center CSC to ask the operator P a question. Accordingly, the convenience of the first user UA can be improved.

Since the first printer 300A outputs the fact that the telephone number TN is transmitted to the second server device 200, the first user UA can know that his or her own telephone number TN is transmitted to the second server device 200. Therefore, the first user UA may wait for the call from the operator P. In other words, the first user UA does not need to call the customer support center CSC to ask the operator P a question. Accordingly, the convenience of the first user UA can be improved.

In the first server device 100 according to the embodiment, the third acquisition unit 113 acquires the telephone number TN by voice from the first user UA, and the instruction unit 116 causes the first printer 300A to output, by voice, the fact that the telephone number TN is transmitted to the second server device 200.

According to this configuration, the telephone number TN is acquired by voice from the first user UA, and the first printer 300A outputs, by voice, the fact that the telephone number TN is transmitted to the second server device 200. Therefore, when the first user UA utters the telephone number TN, the third acquisition unit 113 can acquire the telephone number TN. The first user UA can know that the telephone number TN is transmitted to the second server device 200 by listening to the voice output from the first printer 300A. Accordingly, the convenience of the first user UA can be improved.

The first server device 100 according to the embodiment further includes: the generation unit 114 configured to generate the second answer information AA2 indicating an answer corresponding to the question information QA. The instruction unit 116 causes the first printer 300A to output the second answer information AA2. When the number of times of outputting the second answer information AA2 reaches the predetermined number of times N, the transmission unit 115 transmits the inquiry information EQ to the second server device 200.

According to this configuration, when the number of times of outputting the second answer information AA2 generated by the generation unit 114 reaches the predetermined number of times N, the inquiry information EQ is transmitted to the second server device 200. Therefore, when the number of times of outputting the second answer information AA2 generated by the generation unit 114 reaches the predetermined number of times N, the first user UA can know the first answer information AA1 generated by the first operator PA in response to the question information QA of the first user UA. Therefore, the first user UA can know the first answer information AA1 generated by the first operator PA of the customer support center CSC without calling the customer support center CSC. Accordingly, the convenience of the first user UA can be improved.

By setting the predetermined number of times N to an appropriate number of times, a timing of changing to acquire the first answer information AA1 generated by the first operator PA instead of the second answer information AA2 generated by the generation unit 114 can be appropriately set. Accordingly, the convenience of the first user UA can be improved.

In the first server device 100 according to the embodiment, the inquiry information EQ includes the question information QA and the second answer information AA2.

According to this configuration, since the inquiry information EQ includes the question information QA and the second answer information AA2, the first operator PA of the customer support center CSC can know the question information QA and the second answer information AA2. Therefore, the first operator PA can generate the appropriate first answer information AA1. Accordingly, the first user UA can know the appropriate first answer information AA1. As a result, the convenience of the first user UA can be improved.

The method for controlling the first server device 100 according to the embodiment is the method for controlling the first server device 100 communicably connected to the first printer 300A and the second server device 200 disposed at the customer support center CSC. The method includes: the first acquisition step of acquiring, from the first printer 300A, the question information QA indicating the content of the question input from the first user UA by voice regarding the operation method of the first printer 300A; and the transmission step of transmitting, to the second server device 200, the inquiry information EQ including the question information QA.

According to this configuration, the same effects as those of the first server device 100 according to the embodiment are achieved.

The first control program PG1 according to the embodiment is the first control program PG1 executed by the first processor 110A of the first server device 100, the first server device 100 being communicably connected to the first printer 300A and the second server device 200 disposed at the customer support center CSC. The first control program PG1 causes the first processor 110A to function as: the first acquisition unit 111 configured to acquire, from the first printer 300A, the question information QA indicating the content of the question input from the first user UA by voice regarding the operation method of the first printer 300A; and the transmission unit 115 configured to transmit, to the second server device 200, the inquiry information EQ including the question information QA.

According to this configuration, the same effects as those of the first server device 100 according to the embodiment are achieved.

The embodiment shows one aspect, and can be freely modified and applied without departing from the gist.

In the embodiment, the case where the "printing control device" is the first server device 100 is described, but the present disclosure is not limited thereto. The "printing control device" may be, for example, a personal computer or a tablet terminal.

In the embodiment, the case where the "image forming device" is the ink jet-type printer 300 is described, but the present disclosure is not limited thereto. The "image forming device" may be, for example, a copying machine. Alternatively, the "image forming device" may be, for example, a so-called multifunction machine.

In the embodiment, the case where the printer 300 includes the microphone 320 and the speaker 325, and the second control unit 310 of the printer 300 includes the voice recognition unit 312 and the voice synthesis unit 314 is described, but the present disclosure is not limited thereto. The printer 300 may be communicably connected to, for example, a smartphone, the smartphone may include the microphone 320 and the speaker 325, and a control unit of the smartphone may include the voice recognition unit 312 and the voice synthesis unit 314. The printer 300 may be communicably connected to, for example, a so-called AI speaker, the AI speaker may include the microphone 320 and the speaker 325, and a control unit of the AI speaker may include the voice recognition unit 312 and the voice synthesis unit 314.

In the embodiment, a control method implemented by the first processor 110A of the first server device 100 executing the first control program PG1 is described, but the first control program PG1 executed by the first processor 110A to implement the control method can also be implemented in a form of a computer-readable recording medium or a transmission medium that transmits the first control program PG1.

A magnetic or optical recording medium, or a semiconductor memory device may be used as the recording medium. Examples of the recording medium include portable or fixed recording media such as a flexible disk, an HDD, a compact disk read only memory (CD-ROM), a digital versatile disk ((DVD), a Blu-ray (registered trademark) disc, a magneto-optical disk, a flash memory, and a card-type recording medium.

The recording medium may be a nonvolatile storage device such as a RAM, a ROM, or an HDD that is an internal storage device included in the first server device 100.

The function of the first control unit 110 of the first server device 100 may be implemented by one or a plurality of processors or a semiconductor chip. The first control unit 110 may further include a co-processor such as a system-on-a-chip (SoC), a micro control unit (MCU), or an FPGA. The first control unit 110 may cause both the CPU and the co-processor to cooperate with each other, or may selectively use one of both to perform various controls.

The processing units of the flowcharts in FIGS. 5 and 6 are divided according to the main processing contents in order to facilitate understanding of the processing of the first control unit 110 of the first server device 100 and the second control unit 310 of the printer 300, and are not limited by the way of dividing the processing units and the names. The processing unit of the flowchart may be further divided into more processing units according to the processing content. One processing unit may be divided so as to include more kinds of processing. An order of the processing may be appropriately changed within a range that does not interfere with the purpose.

Each functional unit shown in FIGS. 2 and 3 shows a functional configuration, and a specific implementation form is not particularly limited. There is no need to mount hardware corresponding to each functional unit, and it is also possible to implement a configuration in which one processor executes programs to implement functions of a plurality of functional units. A part of the functions implemented by software in the above-described embodiment may be hardware, or a part of functions implemented by hardware may be software. In addition, specific detailed configurations of other units of the first server device 100 and the printer 300 can be freely changed without departing from the gist.

What is claimed is:

1. A printing control device communicably connected to an image forming device and a server device disposed at a customer support center, the printing control device comprising:
one or more processors; and
a memory including instructions stored therein that, when executed by the one or more processors, cause the printing control device to:
determine whether or not a number of times of outputting answer information to question information is greater than or equal to a predetermined number; and
in a case where the number of times of outputting the answer information to the question information is determined to be greater than or equal to the predetermined number:
acquire, from the image forming device, question information indicating a content of a question input from a user by voice regarding an operation method of the image forming device; and
transmit, to the server device, inquiry information including the question information.

2. The printing control device according to claim 1, wherein the instructions, when executed by the one or more processors, further cause the printing control device to:
acquire, from the server device, first answer information corresponding to the question information and indicating an answer input by an operator of the customer support center; and
cause the image forming device to output the first answer information.

3. The printing control device according to claim 2, wherein the instructions, when executed by the one or more processors, further cause the printing control device to:
acquire a telephone number of the user from the image forming device, wherein
the telephone number is transmitted to the server device, and
the image forming device is caused to output a fact that the telephone number is transmitted to the server device.

4. The printing control device according to claim 3, wherein
the telephone number is acquired from the user by voice, and
the image forming device is caused to output, by voice, the fact that the telephone number is transmitted to the server device.

5. The printing control device according to claim 2, wherein the instructions, when executed by the one or more processors, further cause the printing control device to:
generate second answer information indicating an answer corresponding to the question information, wherein
the image forming device is caused to output the second answer information, and
when the number of times of outputting the second answer information reaches a predetermined number of times, the inquiry information is transmitted to the server device.

6. The printing control device according to claim 5, wherein
the inquiry information includes the question information and the second answer information.

7. A method for controlling a printing control device communicably connected to an image forming device and a server device disposed at a customer support center, the method comprising:
- determining whether or not a number of times of outputting answer information to question information is greater than or equal to a predetermined number; and
- in a case where the number of times of outputting the answer information to the question information is determined to be greater than or equal to the predetermined number;
- acquiring, from the image forming device, question information indicating a content of a question input from a user by voice regarding an operation method of the image forming device; and
- transmitting, to the server device, inquiry information including the question information.

8. A non-transitory computer-readable storage medium storing a program executed by a processor of a printing control device, the printing control device being communicably connected to an image forming device and a server device disposed at a customer support center, the program causing the processor to:
- determine whether or not a number of times of outputting answer information to question information is greater than or equal to a predetermined number; and
- in a case where the number of times of outputting the answer information to the question information is determined to be greater than or equal to the predetermined number;
- a first acquisition unit configured to acquire, from the image forming device, question information indicating a content of a question input from a user by voice regarding an operation method of the image forming device; and
- transmit, to the server device, inquiry information including the question information.

* * * * *